A. E. BRIGHT.
WATERING TROUGH.
APPLICATION FILED JUNE 17, 1913.

1,123,083.

Patented Dec. 29, 1914.

Witnesses
M. F. Gannett
E. Edmonston Jr.

Inventor
A. E. Bright
By Victor J. Evans
Attorney

UNITED STATES PATENT OFFICE.

ALBERT E. BRIGHT, OF IDAGROVE, IOWA.

WATERING-TROUGH.

1,123,083. Specification of Letters Patent. Patented Dec. 29, 1914.

Application filed June 17, 1913. Serial No. 774,175.

*To all whom it may concern:*

Be it known that I, ALBERT E. BRIGHT, a citizen of the United States, residing at Idagrove, in the county of Ida and State of Iowa, have invented new and useful Improvements in Watering-Troughs, of which the following is a specification.

This invention relates to watering troughs and the particular object of the invention is to provide a device of this character having means for automatically preventing overflow and maintaining the water in the tank at a predetermined level irrespective of the quantity consumed by the stock.

Further objects of the invention will appear as the following description is read in connection with the accompanying drawings, in which:—

Figure 1:
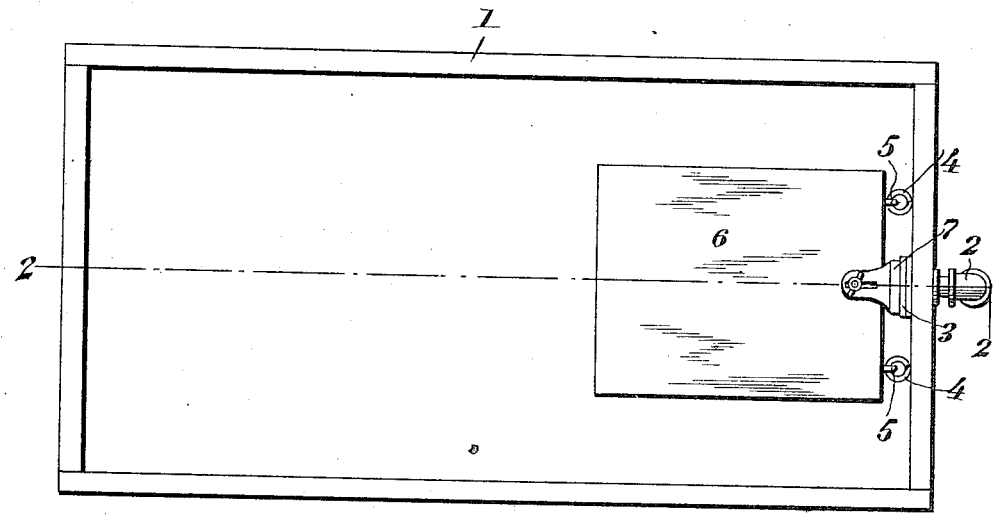
Figure 2:
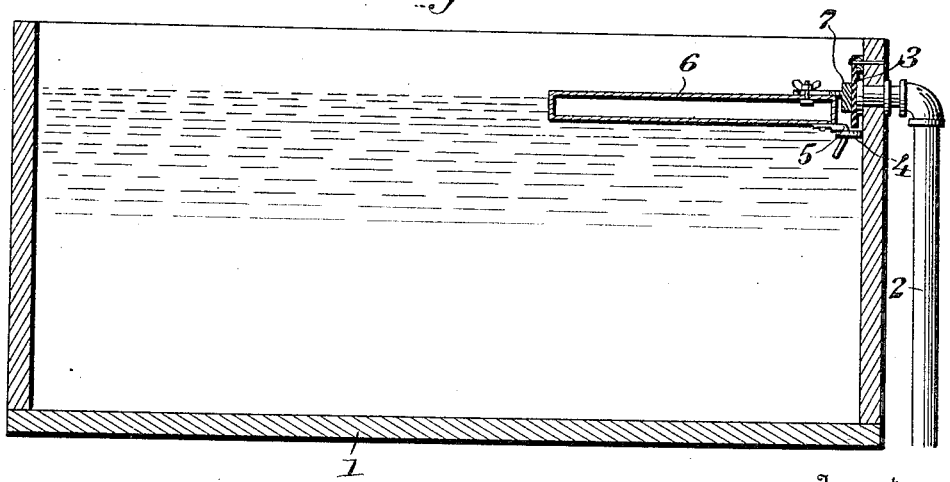

Figure 1 is a top plan view. Fig. 2 is a vertical sectional view on the line 2—2 of Fig. 1.

Referring more particularly to the drawing, 1 represents an ordinary watering trough having a supply pipe 2 leading into one end thereof. Covering the inner end of this pipe is an ordinary flap valve 3 which is adapted to cut off the supply to the tank when pressed against the end of the pipe by the float, as will be hereinafter described. Secured into the end of the tank on opposite sides of the supply pipe are suitable supporting and pivoting eyes 4 which are engaged by the hooks 5 carried by the float 6. This float is constructed preferably of galvanized iron or similar material and is provided with an air chamber so as to insure its buoyancy. As the float has its free end raised its inner end will be moved toward the flap valve in a manner well understood. Instead of bringing the end of the float directly in engagement with the valve I provide an adjustable pressure plate 7 which contacts with the valve when the float is raised so as to cut off the supply through the pipe 2. This pressure plate is made adjustable so that the level of the water in the tank may be readily determined and increased or decreased as desired.

It will be seen that the hooks are so constructed that the float is readily removable from the eyes without tools so that it can be removed from the tank for repairs and for convenience in replacing the flap valve when necessary.

What is claimed is:—

The combination with a trough, a fluid supply pipe leading into the trough and having an enlarged inner end forming a broad flat valve seat, a flap valve pivoted in the trough above the seat, a pair of eyes secured to the trough at a point below said valve, a float, a pair of hooks secured to the under side of the float and adapted for pivotal and removable engagement with the eyes, a plate pivotally and slidably secured to the upper side of the float, and a broad flat head formed on the end of the plate and projecting above and below the upper side of the float, said head being disposed between the valve and the end of the float and adapted to engage the former to force it on its seat when the float rises.

In testimony whereof I affix my signature in presence of two witnesses.

ALBERT E. BRIGHT.

Witnesses:
W. A. KEHOE,
P. E. LUND.

Copies of this patent may be obtained for five cents each, by addressing the "Commissioner of Patents, Washington, D. C."